United States Patent [19]
Marzocchi

[11] 3,873,290
[45] Mar. 25, 1975

[54] METHOD OF PRODUCING DISCONTINUOUS LENGTHS OF DISPERSED FILAMENT STRAND

[75] Inventor: Alfred Marzocchi, Cumberland, R.I.

[73] Assignee: Owens-Corning Fiberglas Corporation, Toledo, Ohio

[22] Filed: June 8, 1973

[21] Appl. No.: 368,423

[52] U.S. Cl.................. 65/2, 65/11 W, 83/913, 241/222
[51] Int. Cl............................................. C03b 37/02
[58] Field of Search............ 65/3, 4, 2, 11 R, 11 W; 241/222, 27, 102; 83/913

[56] References Cited
UNITED STATES PATENTS

| | | | |
|---|---|---|---|
| 2,777,519 | 1/1957 | Speakman | 85/913 X |
| 2,974,554 | 3/1961 | Schurmann et al. | 83/913 X |
| 3,393,985 | 7/1968 | Langlois et al. | 65/11 R X |
| 3,599,848 | 8/1971 | Thumm et al. | 65/11 R X |
| 3,644,109 | 2/1972 | Klink et al. | 65/11 R X |
| 3,771,981 | 11/1973 | Sears et al. | 65/11 R X |

Primary Examiner—Robert L. Lindsay, Jr.
Attorney, Agent, or Firm—Carl G. Staelin; John W. Overman; Ronald C. Hudgens

[57] ABSTRACT

The method of and apparatus for producing dispersed filament glass strand sections including linearly advancing a glass strand along a path towards a collection zone; dispersing at least a portion of the filaments of the strand during advancement towards the zone; and severing the dispersed filament strand into sections.

7 Claims, 9 Drawing Figures

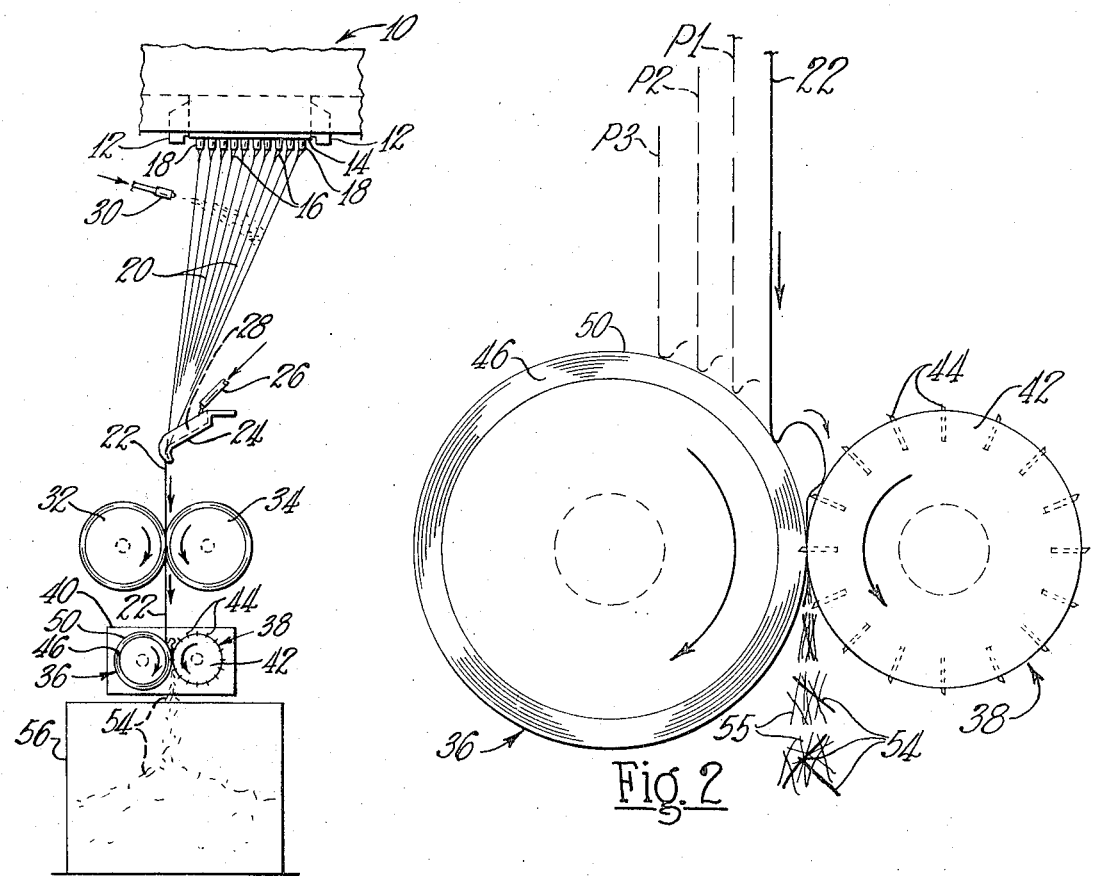
Fig. 1
Fig. 2
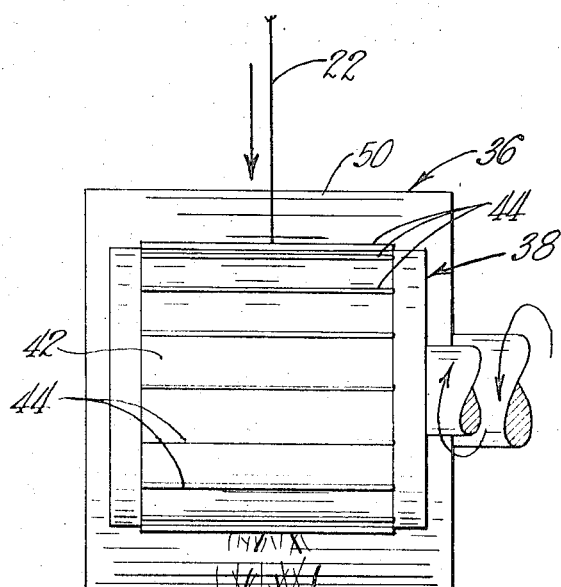
Fig. 3

METHOD OF PRODUCING DISCONTINUOUS LENGTHS OF DISPERSED FILAMENT STRAND

BACKGROUND OF THE INVENTION

It is conventional practice to chop continuous linear bundles of continuous or discontinuous filaments, such as glass roving and strand, into short lengths and use these lengths as reinforcement for polymers. In fact, chopped glass strand has found wide spread use as a reinforcement for elastomers besides thermoplastic and thermosetting plastics.

Through the years there have been efforts to improve chopped glass strand "wetout" and filament dispersion in a polymer matrix to improve polymer reinforcement. These efforts have been directed both to mechanical and to chemical aspects for improving "wetout" and filament dispersion. But the results have not always been satisfactory.

In the production of chopped glass strand, it has been a practice to protect the glass filaments in filament forming operations by applying surface treatments to them before they are combined into a bundle or strand. The very nature of glass filaments demand such application; unprotected glass filaments abrade each other upon contact.

But conventional surface treatments tend to securely adhere the filaments of the bundle together. And such adhesion reduces wetout and filament dispersion of the bundles in a polymer matrix.

Recent developments have allowed glass strand to be chopped directly in a glass filament forming operation. These developements allow use of different types of surface treatments for the glass filaments. These treatments do not so securely adhere the filaments of the bundle together. Consequently, chopped glass strands made according to the recent developments show improved wetout and filament dispersion. But further improvements are needed.

There has been increasing demand for longer length chopped glass strand for use as polymer reinforcement. But these longer length strands are more difficult to disperse within a polymer matrix since they tend to tangle with each other.

Improvements in chopped strand wetout and filament dispersion in polymer matrices are needed, especially for long length chopped strand.

SUMMARY OF THE INVENTION

An object of the invention is improved method of and apparatus for producing discontinuous lengths of multifilament linear material.

Another object of the invention is method of and apparatus for dispersing at least a portion of the filaments of a filament bundle, such as glass strand, and severing the dispersed bundle into sections directly in a filament forming operation.

Yet another object of the invention is production of short lengths of glass strand that are more easily wetout and are more easily dispersed in polymer matrices.

These and other objects are attained by linearly advancing a linear bundle of filaments along a path towards a collection zone; dispersing at least a portion of the filaments of the bundle during advancement of the bundle towards the collection zone; and severing the dispersed bundle into discontinuous lengths or sections for collection in the zone.

Other objects and advantages will become apparent as the invention is more fully described with reference made to the accompanying drawings.

DESCRIPTION OF THE DRAWINGS

FIG. 1 is a side elevation view of a glass filament forming operation including apparatus for dispersing at least a portion of the filaments of a glass strand and for severing the dispersed strand into short lengths or sections according to the principles of the invention.

FIG. 2 is an enlarged side elevation view of the strand cutter roll and cot roll during their rotation. The strand is bounced from the cot roll into a severing zone between the cutter and cot rolls. The strand is severed into sections.

FIG. 3 is an enlarged front elevation view of the apparatus shown in FIG. 2.

DESCRIPTION OF THE PREFERRED EMBODIMENTS

Figure 4:
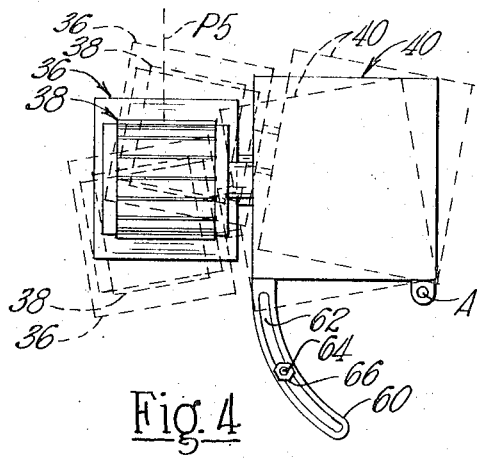
FIG. 4 is a front elevation view of the strand chopping housing shown in FIG. 1. The housing is movably mounted to allow changes in the angle of impingement between the glass strand and cot roll.

The method and apparatus of the invention for producing discontinuous filament lengths are particularly useful in filament forming operations that produce filaments of heat-softened mineral material such as molten glass. But the method and apparatus of the invention are also useful in other processes that disperse filaments of multifilament linear material or filament bundles and that thereafter sever the dispersed bundle into sections or segments.

The invention can be used to process different type of filament bundles. And the bundle can be twisted or have no twist. The bundle can include continuous or discontinuous filaments. The invention can be used to process glass strand; the invention can be used to process bundles of synthetic filaments such as nylon and polyester. The bundle can be in the form of yarn, cord, roving, etc. So the disclosure of apparatus for dispersing filaments of a glass strand in a glass filament forming operation and severing the dispersed filament strand into sections is only an example to explain the operation of the invention.

FIGS. 1-3 show production of short lengths of dispersed filament glass strand in a continuous glass filament forming operation. The newly formed filaments are combined into a closely grouped linear bundle or strand that is linearly advanced along a given path towards a collection zone. Advancement of the strand along the path is interrupted by impingement against a surface. The impingement is sufficient to disperse at least some of the filaments of the strand. The dispersed filament strand is severed into short lengths that are accumulated in the collection zone.

As illustrated in FIGS. 1–3, a bushing or container 10, which is conventionally made of platinum or an alloy of platinum, holds a supply of molten glass. The container 10 connects to a forehearth that supplies molten glass from a furnace. It can connect to other means for supplying molten glass. For example, the container 10 can connect to a melter effective to reduce glass marbles to a heat-softened condition.

Electrical terminals 12 are at the ends of the container 10; these terminals connect to a source of electrical energy. When the container 10 is electrically energized through the terminals 12, the container 10 supplies heat by conventional resistance heating to molten glass held in it. This heat keeps the molten glass at proper fiber forming temperatures and viscosities.

The container 10 has a bottom wall 14 with orifices or passageways for delivering individual streams 16 of molten glass from the body of molten glass held in the container. In the embodiment shown in FIGS. 1–3 the openings in the bottom wall 14 comprise rows of spaced apart depending orificed projections or tubular members 18.

Individual continuous glass filaments 20 are attenuated or withdrawn from individual molten glass streams 16. The advancing filaments 20 are combined into a strand 22 below the container 10 as they turn on a gathering member 24.

The gathering member 24 applies a liquid coating to the advancing filaments 20 besides gathering them. A supply tube 26 is immediately above the member 24. Suitable conventional supply means provides coating liquid to the tube 26, which discharges the liquid to a downwardly inclined throughlike channel 28 in the member 24. Coating liquid moves down the channel 28 to the speeding filaments 20 as they are combined into the strand 22.

Normally water and a coating liquid, which can be sizing or other protective coating material, are applied to the filaments 20. But water only might be applied to the filaments 20. Also, a coating only might be applied. As shown a nozzle 30 adjacent to the bottom wall 14 directs water spray onto the continuous glass filaments before the member 24 combines them into the glass strand 22.

A pair of rotatably driven coacting pull wheels 32 and 34 below the member 24 supply the force for withdrawing the filaments 20 from the molten glass streams 16 and gathering the filaments into the strand 22 on the member 24.

The cooperating pull wheels 32 and 34, which are rotated at high speeds, draw the strand 22 between them and project it downwardly along a given path towards a strand severing station and strand colleciton zone. As shown the wheels 32 and 34 each rotate about a horizontal axis and cooperate to advance the strand 22 downwardly towards a collection zone along a vertical path at speeds up to 10,000 feet-per-minute and faster.

A cot roll 36 and a cutter roll 38 are rotatably held on a drive housing 40. The rolls 36 and 38, which are in adjacent relationship, form a strand severing zone between them. A conventional motor and drive arrangement within the housing 40 rotates the rolls 36 and 38. As shown the cutter roll 38 includes a cylindrical core or body 42 and blades 44 that extend radially from the circumferential surface of the body 42. As shown the cot roll 36 includes a circumferential surface region 46 of resilient material, for example rubber or urethane. But strand chopping apparatus that uses a cot roll having a harder surface, such as metal, can be used.

The pull wheels 32 and 34 linearly project the strand 22 downwardly to impinge against the moving circumferential surface 50 of the cot roll 36. The rotational speed of the wheels 32 and 34 is arranged to impart motion to the strand 22 with sufficient kenetic energy to separate at least a number of the filaments 20 of the strand 22 upon impingement against the circumferential surface 50 of the rotating cot roll 36.

As shown in FIGS. 1–3 the strand 22, upon striking the surface 50 rebounds or bounces therefrom. The amount of bounce is a function of strand speed and weight. So the amount of bounce can be controlled. In FIG. 2 the dispersed strand 22 is bounced in somewhat of an open looped configuration into the strand severing region or zone between the rolls 36 and 38. And these rolls sever the dispersed strand 22 into short filament sections 54 and individual filaments 55. Normally some of the dispersed or separated filaments remain in the severed strand sections 54, although it is common to have some of the filaments completely leave the sections as shown by the filaments 55. The surface tension of the liquid on the strand sections 54 tends to hold the dispersed filaments of the strand together. At times all of the dispersed filaments remain with the sections 54. Then too, upon severance all of the filaments of the sections 54 might be completely separated into individual filaments.

The short sections or lengths 54 and filaments 55 fall for collection into a box 56 below the rolls 36 and 38.

The amount of filament dispersion can be controlled. The number of filaments dispersed by impingement of the strand 22 has been found controllable by adjusting the angle of impingement between the strand and the impinged surface and by regulating the speed of the strand 22.

The closer the angle between the strand path and the impinged surface is to 90 degrees (radial for a circumferential surface) the greater is the amount of filament dispersion effected for a given linear strand speed. That is, if a strand impinges a surface along a path directly perpendicular to the surface, the greatest amount of filament dispersion is effected for a given linear strand speed and surface speed. And this holds true where the impinged surface is stationary.

As an illustration, in FIG. 2 the dashed lines denoted $P_1$, $P_2$, and $P_3$ indicate other possible strand paths besides the actual path shown in FIG. 1. Each of these paths intersects the curved surface 50 at different angles. So a strand advanced along each of these paths would effect a different filament dispersion for a given linear strand speed and angular cot roll speed. A strand impinging the circumferential surface 50 along the path $P_1$ would effect the least filament dispersion of a strand, except for the actual strand path shown. On the other hand, a strand impinged against the surface 50 along the path $P_3$ would effect the greatest dispersal of filaments.

The degree of filament dispersion of a strand is also controlled by the cohesive or bonding effect of the liquid applied to the strand prior to dispersing its filaments. So it may be advantageous at times to apply a liquid to a strand that promotes filament dispersion. For example, a liquid containing a lubricant might be applied to the strand 22 to promote filament dispersion. The lubricant might be an organic system, such as a condensate of amines and fatty acids solubilized with acetic acid, sterato chromyl chloride (Werner-complex lubricant) or cetyl or stearyl monoamine hydrochloride or acetate. An inorganic system, such as salts of barium, might be used; for example, barium nitrate and barium chloride might be used. Also, one can use organo silanes, such as alkyl-trichloro silanes, vinyl triethoxy silanes, gamma amino propyl triethoxy silanes and glycidoxy silanes, depending upon the polymer with which compatability is desired. Upon drying collected strand sections would tend to separate into individual filaments.

The length of the sections 54 can be controlled. For example, the direction of strand impingement can be changed in relation to the direction of motion imparted to the circumferential surface 50 to vary the length of the sections 54. FIG. 4 shows an arrangement for moving the housing 40 so that the direction of strand travel to the surface 50 is generally transverse to the direction of motion given to such surface. As shown the housing 40 is pivotally mounted at the lower right hand corner by a pivot A (as seen in FIG. 4). An arcuate member 60, which includes an arcuate slot 62, connects at one end to the other corner of the housing 40 opposite the pivot A. The threaded portion of a stationary rod 64 extends through the slot 62. And securing means including a nut 66 on the threaded portion of the rod 64 can be tightened to hold the housing 40 at desired dispositions.

The dashed lines in FIG. 4 indicate two inclined positions for the housing 40. In one position the housing 40 is inclined upwardly and in the other position the housing 40 is inclined downwardly. Of course, the cutter roll 38 and cot roll 36 move with the housing 40 to change the orientation of the cot roll 36 and cutter roll 38 with respect to the projected strand 22. So when the housing 40 is oriented with the axes of the rolls 36 and 38 inclined to the horizontal, the downwardly projected strand 22 proceeds along a path that is generally oblique with the direction of motion of the circumferential surface 50 of the cot roll 36. And this orientation disposes the impinged strand 22 in an oblique relationship with the blades 44. Consequently, the strand 22 is cut or severed into longer lengths than a strand advanced to impinge the surface along a path extending in a direction parallel to the direction of surface movement. Larger angles between the direction of surface motion and strand motion generally effect a more oblique relationship between the blades 44 and the strand. And longer lengths of strand are severed.

The length of the filament sections 54 can also be controlled by the amount of bounce imparted to the strand 22 upon striking the surface 50 of the cot roll 36. Greater bounce effects longer loop or whorl configurations to the strand. If the strand impingement location is close to the severing zone (like the arrangement shown in FIG. 2), the strand is moved into the severing zone on the fly in a curved configuration. And the size of the curved shape, which can be controlled, effects differences in the length of the sections 54. Larger bounces produce strand configurations that increase the length of the sections 54 effected by the rolls 36 and 38. If the strand impingement location is further away from the severing zone, the strand 22 can fall to the surface 50 with a curved configuration, which depending upon the linear speed of the strand 22 and rotational speed of the roll 36, changes the length of the filament sections effected by the rolls 36 and 38.

Of course, it is possible to vary the bounce imparted to the strand together with its direction of strand impingement in relation to the direction of motion of the impinged surface.

Figure 5:
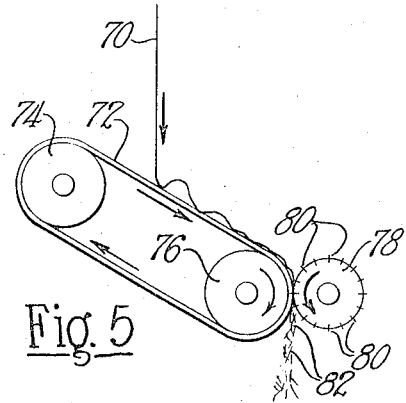
FIG. 5 is a side elevation view of another embodiment of apparatus for producing short bundles of glass filaments according to the principles of the invention.
Figure 6:
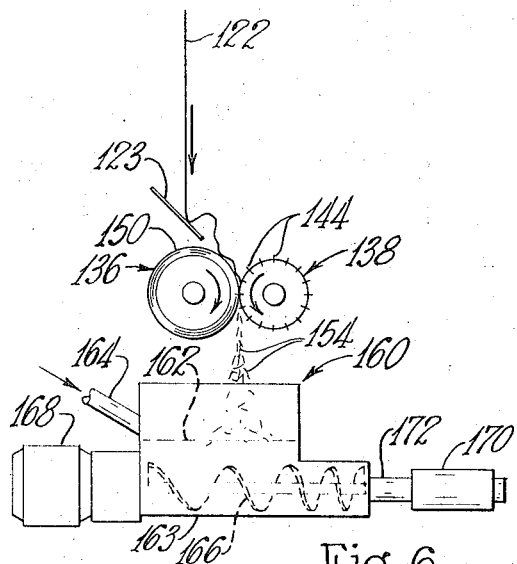
FIG. 6 is a side elevation view of still another embodiment of apparatus according to the principles of the invention. Short lengths of glass strand fall into a mixer that feeds polymer to an extruder.

FIG. 5 shows another embodiment of apparatus for processing and severing a linear bundle of filaments such as a strand according to the principles of the invention. As shown means projects a glass strand 70 downwardly against the surface on a continuous conveyor belt 72 moving between drive wheels 74 and 6. The strand projecting means can be a pair of pull wheels like the wheels 32 and 34 shown in FIGS. 1–3.

The strand 70 is projected downwardly to impart motion to the strand 70 with sufficient kinetic energy to disperse at least a portion of the filaments of the strand 70 upon impingement against the surface of the conveyor belt 72.

The conveyor belt 72 advances the dispersed filament strand to a strand severing station. As illustrated the strand severing apparatus includes a chopper roll 78 with radially extending blades 80 that are in strand severing relationship with the conveyor belt 72 as the belt is moved across the drive wheel 76. The drive wheel 76 and chopper 78 are appropriately driven in rotation by conventional motor and drive means.

The strand 70 is severed into short filament sections or lengths 82 that fall to a collection region below.

FIG. 5 shows another embodiment of the apparatus according to the principles of the invention. Means (such as the pull wheels 32 and 34 shown in FIGS. 1–3) projects a glass strand 122 against the upper inclined surface of a stationary metal plate 123. As with the other embodiments, impingement of the strand 122 against a surface of the plate 123 is sufficient to disperse at least a portion of the filaments of the strand 122.

The plate 123 is inclined toward the circumferential surface 150 of a cot roll 136, which is driven in rotation; the cot roll 136 is like the cot roll 36 shown in FIGS. 1–3. The energy of impingement between the plate 123 and the strand 122 is sufficient to deflect the strand 122 onto the moving circumferential surface of the rotating cot roll 36.

A cutter roll 138, which has radially extending blades 144, is in strand severing relationship with the cot roll 136. And the circumferential surface 150 of the rotating cot roll 136 carries the strand 122 between the cot roll 136 and the cutter roll 138 where it is severed into sections 154.

The sections 154 fall into a screw mixer 160 where the filaments are dispersed in a resinous matrix 162 held in mixing box 163. As shown the mixer 160 includes a supply tube 164 through which resin from an appropriate source is supplied to the box 163 and a mixing and feed screw 166 rotatably driven by a motor 168.

In the embodiment of FIG. 5 the matrix 162 (with glass strand dispersed throughout it) is fed into commercial extruder 170 through a feed tube 172.

Figure 7:
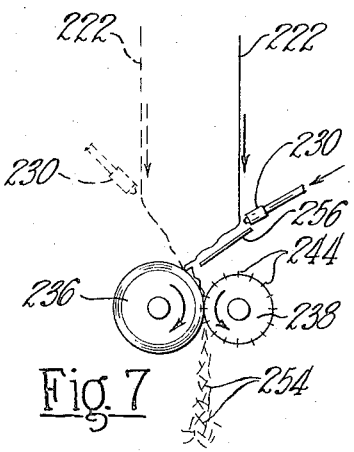
FIG. 7 is a side elevation view of yet another embodiment of apparatus for producing short bundles of glass filaments according to the principles of the invention.

FIG. 7 shows still another embodiment of apparatus for producing short filament lengths according to the principles of the invention. A strand 222 is projected along a given path towards a strand severing zone. And during its advancement the projected strand 222 is sufficiently disturbed by a stream of fluid to disperse at least a portion of the filaments of the strand 222. As shown a nozzle 230 discharges a fluid stream that impinges the strand 122 during its advancement. The stream might be liquid or gaseous stream.

The dashed lines indicate another location for the strand 222 and nozzle 230.

The dispersed filament strand is deposited on the circumferential surface of a rotating cot roll 236, which is in strand severing relationship with a cutter roll 238 having radially extending blades 244. The circumferential surface of the rotating cot roll 236 moves the strand between the rolls 236 and 238. And the strand is severed into short sections 254 that fall to a collection region below.

A plate 256, like plate 123, is adjacent the exit of the nozzle 230 in case of a nozzle failure.

Figure 8:
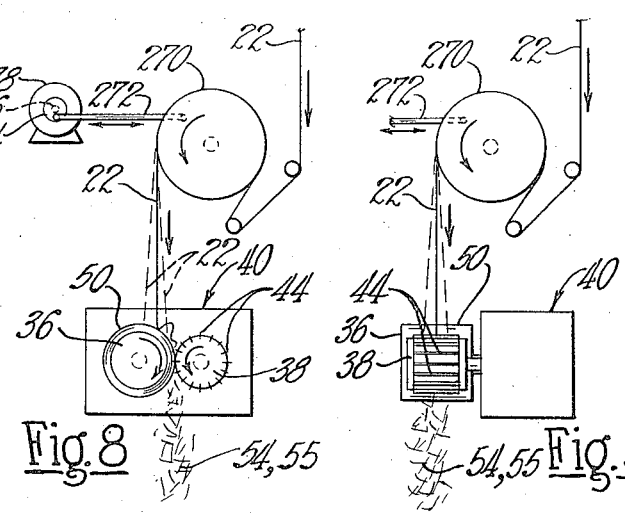
FIG. 8 is a side elevation view of still another embodiment of apparatus according to the principles of the invention.
Figure 9:
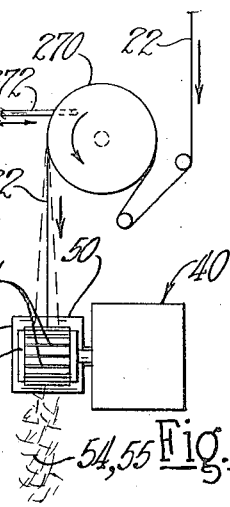
FIG. 9 is a front elevation view of yet another embodiment of apparatus according to the principles of the invention.

FIGS. 8 and 9 show pull wheel and strand severing apparatus arrangements for reciprocating a strand across the circumferential surface of a cot roll adjacent the severing zone to control the length of the dispersed strand sections 54 and filaments 55. In FIG. 8 a conventional single pull wheel 270 projects the strand 22 downwardly onto the circumferential surface 50 of the cot roll 36. The pull wheel 270 effects reciprocation of the strand 22 back and forth in a direction generally normal to the axes of the cot roll 36 and the cutter roll 38.

The pull wheel 270 is conventionally driven in high speed rotation. And as shown a link 272 pivotally connects at one end to a movable plate of the pull wheel 270 and pivotally connects at the other end to a cam 274 on the output shaft 276 of an electric motor 278. Rotation of the cam 274 by the motor 278 reciprocates a movable plate. And reciprocation of the movable plate moves a driven rotatable spider wheel within the pull wheel 270 to effect strand reciprocation as indicated by the dashed lines in FIG. 8.

The apparatus of FIG. 9 is the same as FIG. 8, except the pull wheel 270 and cot rolls 36 and cutter rolls 38 have been rotated 90 degrees with respect to each other. Accordingly, the strand 22 is reciprocated across the circumferential surface 50 of the cot roll in a direction axially of the roll.

I claim:

1. The method of producing discontinuous filament lengths comprising:
   linearly advancing filaments as a continuous linear bundle towards a severing zone;
   dispersing at least some of the filaments of the bundle during advancement by impinging the bundle against a surface moving towards the severing zone;
   moving the dispersed bundle from the impingement zone to the severing zone; and
   severing the dispersed bundle into discontinuous lengths in the zone.

2. The method of claim 1 in which the surface is moving along a curved path.

3. The method of claim 1 in which a stream of fluid is directed against the bundle to disperse its filaments prior to impingement against the surface.

4. The method of producing short lengths of dispersed filament bundles comprising:
   linearly projecting a closely grouped continuous linear bundle of filaments along a path towards a severing zone;
   impinging the linearly projected bundle against a surface adjacent the severing zone with sufficient energy to disperse a portion of the filaments of the bundle and to bounce the bundle into the severing zone; and
   severing the bounced bundle into short lengths in the zone.

5. The method of producing short lengths of dispersed filament glass strand comprising:
   supplying streams of molten glass;
   withdrawing glass filaments from the streams;
   gathering the filaments into a strand;
   linearly projecting the strand downwardly along a path towards a strand severing zone;
   impinging the strand against a surface moving in a direction toward the strand severing zone, the strand being projected with sufficient energy to disperse a portion of the filaments of the strand;
   moving the dispersed filament strand to the severing zone; and
   severing the strand into short lengths in the zone.

6. The method of producing short lengths of dispersed filament glass strand comprising:
   linearly projecting a glass strand along a given path towards a strand severing zone formed between the circumferential surfaces of a rotating cot roll and the blades of a rotating cutter roll;
   impinging the strand against the circumferential surface of the rotating cot roll adjacent the severing zone with sufficient energy to disperse a portion of the filaments of the strand; and
   severing the dispersed filament strand into short lengths in the zone.

7. The method of producing short lengths of dispersed filament glass strand comprising:
   supplying streams of molten glass;
   withdrawing continuous glass filaments from the streams;
   combining the filaments into a strand;
   linearly projecting the strand downwardly towards a strand severing zone formed between the circumferential surface of a rotating cot roll and the blades of a rotating cutter roll;
   impinging the strand against the circumferential surface of the rotating cot roll with sufficient energy to disperse a portion of the filaments of the strand and to bounce the dispersed filament strand into the severing zone; and
   severing the strand into short lengths in the zone.

* * * * *